United States Patent
Aikawa et al.

(10) Patent No.: US 7,558,323 B2
(45) Date of Patent: Jul. 7, 2009

(54) VIDEO DATA TRANSMISSION METHOD FOR CHANGING TRANSMISSION DATA AMOUNTS IN ACCORDANCE WITH A TRANSMISSION SPEED AND A TRANSMISSION SYSTEM THEREFOR

(75) Inventors: Tomohiro Aikawa, Tokyo (JP); Yuichi Onami, Iruma (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 839 days.

(21) Appl. No.: 10/721,885

(22) Filed: Nov. 26, 2003

(65) Prior Publication Data

US 2004/0105494 A1 Jun. 3, 2004

(30) Foreign Application Priority Data

Nov. 27, 2002 (JP) .............................. 2002-344385

(51) Int. Cl.
H04N 7/18 (2006.01)
(52) U.S. Cl. .............................. 375/240.25; 375/240.26
(58) Field of Classification Search ................................ 375/240.01–240.29
See application file for complete search history.

(56) References Cited

U.S. PATENT DOCUMENTS 6,014,694 A * 1/2000 Aharoni et al. ............. 709/219
6,079,566 A * 6/2000 Eleftheriadis et al. ........ 707/101
6,826,231 B2 * 11/2004 Takahashi et al. ...... 375/240.16
6,965,646 B1 * 11/2005 Firestone ............... 375/240.26

FOREIGN PATENT DOCUMENTS

| JP | 08317384 | 11/1996 |
|----|----------|---------|
| JP | 2000209555 | 7/2000 |

* cited by examiner

*Primary Examiner*—Andy S Rao
(74) *Attorney, Agent, or Firm*—Mattingly, Stanger, Malur & Brundidge, P.C.

(57) ABSTRACT

In a picture transmission network including networks of different transmission speeds, when a picture is sent at a bit rate which is adjusted to the transmission speed of a low-speed network, only a low-quality picture of a low bit rate is obtained in a video reception unit connected to a network of a high transmission speed. When a picture is sent at a transmission rate of a network having high transmission speed, the picture cannot be reproduced at all in a video reception unit connected to a network of a low transmission speed. To solve the problem, a video transmission unit generates at least an I picture data and a plurality of P picture data. In accordance with a request from the network, the I picture data and a predetermined number of P picture data is transmitted to the network.

12 Claims, 13 Drawing Sheets

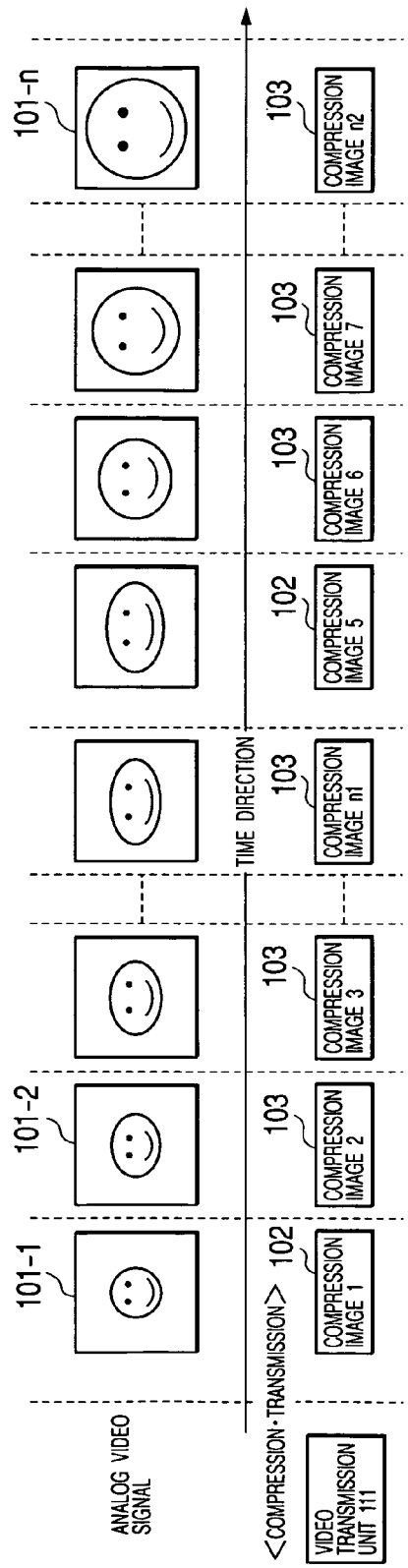
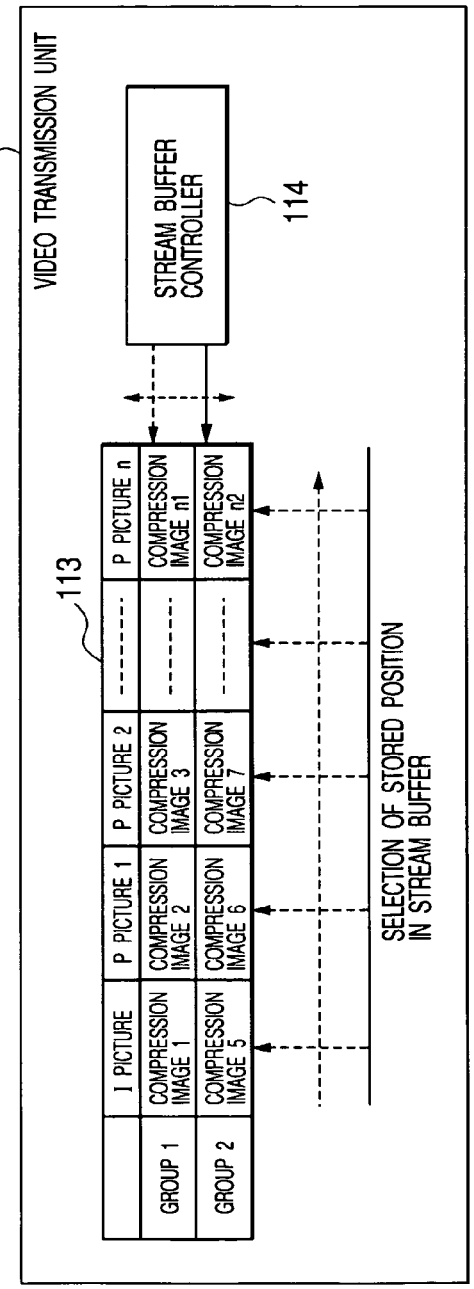

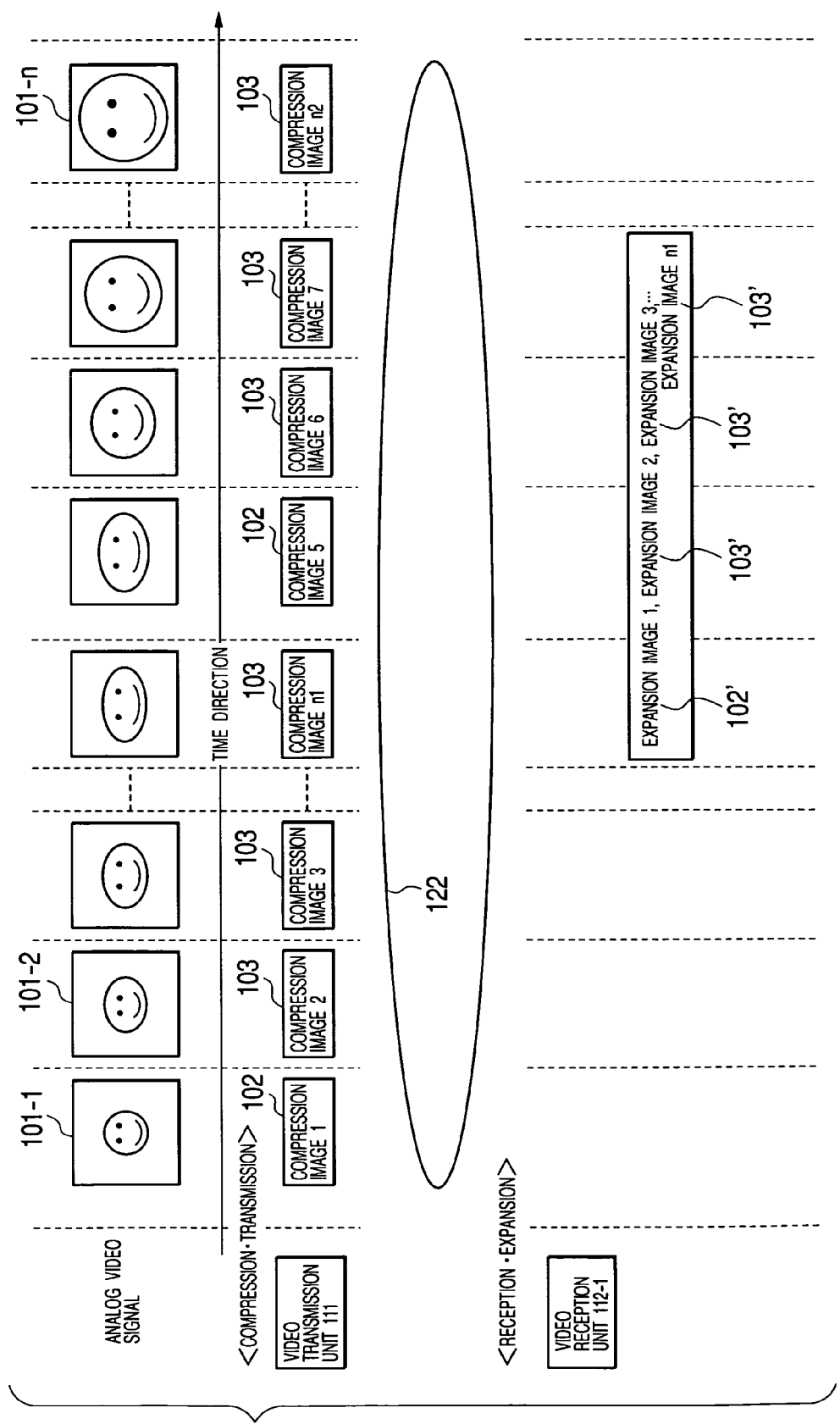

VIDEO DATA TRANSMISSION METHOD FOR CHANGING TRANSMISSION DATA AMOUNTS IN ACCORDANCE WITH A TRANSMISSION SPEED AND A TRANSMISSION SYSTEM THEREFOR

FIELD OF THE INVENTION

The present invention relates to a video data transmission method and system and, more particularly, to a motion picture transmission method and system for compressing a motion picture and transmitting the compressed motion picture to a network.

BACKGROUND OF THE INVENTION

In a remote picture monitoring system or picture distributing system, needs for a motion picture transmission apparatus using, as a transmission line, an IP (Internet Protocol) network typified by a public line or the Internet are rapidly increasing. For example, in distribution of stream data (which is compressed data) of a picture according to the MPEG-4 (Moving Picture Experts Group Phase 4) encoding, conventionally, picture data to be transmitted is coded in accordance with the MPEG-4 encoding and the coded picture is temporarily stored as stream data into a memory unit of a video transmission unit. The video data includes a still picture, a motion picture, CG (Computer Graphics), and animation and also includes sound, audio, synthetic music, and the like. The video data is distributed from the memory unit of the video transmission unit in response to a request from a network.

In order to distribute such video data, particularly, a motion picture, the video data has to be converted to digital data. In the case of converting the video data to digital data, the amount of information is enormous. Consequently, to reduce the transmission amount of the information, a motion picture compression technique is necessary. In this case, a world standard system of compression of a motion picture such as MPEG-2 or MPEG-4 encoding which has been conventionally well known is used.

FIG. 12 shows an example of a general network-type motion picture distribution system and shows, for example, a schematic configuration of a motion picture surveillance system. FIG. 12 shows, for example, a case of monitoring a motion picture of a surveillance camera 120 by video monitors 124-1, 124-2, and 124-3 in three places apart from the surveillance camera 120. When it is not necessary to particularly discriminate the video monitors 124-1, 124-2, and 124-3 from each other, they will be generically called the video monitor(s) 124. As networks often used, for example, an LAN (Local Area Network) 122-1, an ADSL (Asymmetric, Digital Subscriber Line) 122-2, and a third generation portable telephone network 122-3 such as W-CDMA (Wide-Code Division Multiple Access) are shown. When they do not have to be discriminated from each other, they will be generically called the network(s) 122. The network 122 is constructed by transmission lines of different transmission speeds. For example, the LAN 122-1 is a relatively high-speed network having transmission speed of about 6 Mbps, the ADSL 122-2 has transmission speed of 512 kbps, and the third generation portable telephone network 122-3 is a low-speed network having transmission speed of 384 kbps.

A surveillance picture captured by the surveillance camera 120 is coded by a video transmission unit 121 such as an encoder, and the encoded picture is distributed to video reception units 123-1, 123-2, and 123-3 such as decoders via the network 122 and decoded. The decoded picture is displayed as a monitor picture on each of the video monitors 124-1, 124-2, and 124-3.

The video transmission unit 121 for compressing a motion picture transmits picture compression data (also called a stream) generated by being compressed at a predetermined bit rate (compression ratio) by a compression processing unit 125 in the video transmission unit to the video reception units 123-1, 123-2, and 123-3. Each of the video reception units 123-1, 123-2, and 123-3 decompresses the stream to the original picture data and outputs the picture data to the monitor. In FIG. 12, a series of streams is transmitted from the video transmission unit 121 to the networks 122-1, 122-2, and 122-3. A transmission system in which the networks are connected in series is called a multicast configuration.

In the operation of the system, for example, a request for stream data is transmitted from the video reception unit 123-1 to the video transmission unit 121 via the network 122-1. The video transmission unit 121 distributes stream data to the video reception unit 123-1 which has requested for the stream data.

The video reception unit 123-1 receives the stream data, decompresses the compressed stream data, displays the decompressed stream data on the monitor 124-1 and, as necessary, records it to a recording unit (not shown). After that, the video reception unit 123-1 sends a request for the next stream data to the video transmission unit 121 via the network 122-1.

The video transmission unit 121 transmits the next stream data to the video reception unit 123-1 which has requested for the stream data. The video reception unit 123-1 receives the next stream data, in a manner similar to the above, decompresses the compressed stream data, displays the decompressed stream data on the monitor 124-1 and, as necessary, records it into a recording unit.

Similarly, each of the other video reception units 123-2 and 123-3 also sequentially sends a transmission request for stream data, receives it and decompresses it.

In the case of the multicast configuration, the number of the compression processing unit 125 in the video transmission unit 121 is one, so that streams transmitted to the video reception units 123-1, 123-2, and 123-3 are the same stream, and the bit rate (compression ratio) of the streams is also the same. Therefore, as long as the bit rate of stream data output from the video transmission unit 121 is not adjusted to that of a network of the lowest transmission speed among the networks 122 to the video reception units 123, a motion picture cannot be decompressed in all of the video reception units 123 which receives the stream.

In the case of FIG. 12, 384 kbps of the third generation portable telephone network is a bottleneck, so that the bit rate of a stream output from the video transmission unit 121 is limited to 384 kbps or lower. Although the video reception unit 123-1 connected to the high-speed network 122-1 can inherently decompress stream data of a high bit rate of about 6 Mbps and output a high-quality picture to the video monitor 124-1, only a low-quality picture of about 384 kbps can be obtained due to the limitation. Similarly, also in the video reception unit 123-2 connected to the network 122-2 of 512 Kbps, only a low-quality picture of about 384 kbps is obtained as a result.

Also in the arrangement of outputting a stream of about 4 Mbps from the video transmission unit 121 in accordance with the high-speed network 122-1, the stream cannot be transmitted at 512 kbps of the ADSL or 384 kbps of the third generation portable telephone network. Consequently, the stream data is not transmitted to the video reception units 123-2 and 123-3 and no motion picture is output.

The picture compressing technique of the MPEG system will be described. MPEG-2 or MPEG-4 picture compression data, that is, stream data is constructed by three kinds of data of an intra picture (hereinbelow, called an I picture), a predictive picture (hereinbelow, called a P picture), and a bidirectionally predictive picture (hereinbelow, called a B picture). The pictures are compressed in three different encoding modes. The I picture is data obtained by coding all of video data of one frame of an analog picture within the frame. Therefore, in the case where an I picture is received, the video reception unit 123 can reproduce the picture only from the one I picture. The P picture is data obtained by performing inter-frame prediction in one direction from the immediate preceding picture data (I picture or P picture) and encoding only the difference data. Therefore, the video reception unit 123 cannot reproduce the picture only from the received P picture without using an I picture. Further, if there is no P picture in some midpoint, an erroneous picture such as a picture in which block distortion occurs is resulted. The B picture is obtained by performing bidirectional inter-frame prediction from data of two pictures of previous and subsequent pictures. Like the P picture, the original B picture cannot be reproduced only from the B picture. Since redundancy in the time base direction with the preceding and subsequent pictures is reduced, the compression data amount of the P and B pictures can be reduced. However, an original picture cannot be reproduced only from the picture itself. An example of a combination of general MPEG-2 pictures is shown as follows.

(I) (B) (B) (P) (B) (B) (P) (B) (B) (P) (B) (B) (P) (B) (B) (I) (B) (B) (P) . . . .

As described above, in a common configuration, the I picture exists in every 15 pictures.

U.S. Pat. No. 6,157,675 discloses a video transmission apparatus for transmitting a picture to networks of different transfer speeds of the MPEG system. The video transmission apparatus changes the bit rate of coded data without changing the number of pictures to be transmitted. Specifically, the apparatus generates a copy picture obtained by copying a picture of coded data which was transmitted before on the basis of the difference between the bit rate of coded data and a predetermined transmission rate of a transmission line, and transmits the copy picture instead of data to be inherently transmitted, thereby reducing the data amount and transmitting the picture at the predetermined transmission rate.

According to the method, a picture transmitted before is copied. Therefore, the difference between the present picture and the immediately preceding picture is "0" and only data indicative of a copy is sent. Thus, the data amount can be largely reduced and data can be transmitted at a desired transmission rate. However, since a picture to be transmitted is a copy picture, for a picture having motion like a motion picture, a faithful motion picture cannot be transmitted.

SUMMARY OF THE INVENTION

According to conventional techniques, in a video transmission system in which a plurality of networks having different transmission speeds are connected, for example, even when a picture captured by a camera is requested to be distributed via networks having different transmission speeds to, for example, a monitor, a video transmission unit (encoder) for compressing a picture can generate only a stream of a low bit rate adapted to the transmission speed of a network of the lowest speed. Since only the stream of the low bit rate can be transmitted to a video reception unit (decoder), there is a problem such that a video reception unit connected to a high-speed network receives only a low-quality picture having low bit rate.

Although the bit rate of a stream from the video transmission unit is adjusted to the transmission rate of the high-speed network, the video reception unit connected to the high-speed network can receive a high-quality picture. However, there is a problem such that a video reception unit connected to a network having transmission speed lower than that cannot reproduce a picture at all.

Further, in the case where the video transmission unit transmits, for example, the latest stream data to the video reception unit which requests for a stream, the video reception unit having low transmission speed which cannot follow the interval of distribution of the video transmission unit has a problem that block distortion occurs in a reproduction picture due to discontinuous stream decompression.

An object of the present invention is to provide a video data transmission method and a video transmission system capable of distributing stream data to transmission lines of different transmission speeds.

Another object of the present invention is to provide a video data transmission method and a video data transmission system in which block distortion does not occur even in a video reception unit using a low-speed line having low transmission speed which cannot follow intervals of distribution of a video transmission unit.

Further another object of the present invention is to provide a video data transmission method and a video data transmission system capable of optimally distributing a motion picture also to transmission lines of different transmission speeds.

According to the present invention, to achieve the above objects, there is provided a motion picture transmission method for transmitting video data through a transmission line that a motion picture signal is coded in a video transmission unit, the method comprising the steps of: generating at least an I picture data and a plurality of P picture data by the video transmission unit; and transmitting the I picture data and a predetermined number of pieces of P picture data in accordance with a request from the transmission line.

In the motion picture transmission method according to the present invention, the transmission line is constructed by transmission lines of different transmission speeds of the video data, and the number of the P picture data is changed according to the transmission speeds of the transmission lines.

In the motion picture transmission method according to the present invention, the video transmission unit encodes the motion picture signal in conformity with MPEG-4 or MPEG-2.

In the motion picture transmission method according to the present invention, in the case where it is determined that the I picture data is constructed by at least first I picture data and second I picture data, transmission of the P picture data subsequent to the first I picture data is stopped and transmission is started from the second I picture data.

In the motion picture transmission method according to the present invention, when the number of the P picture data is changed and the changed number of the P picture data is transmitted in accordance with the transmission speed of the transmission line, the number of P picture data subsequent to the I picture data is changed.

In the motion picture transmission method according to the present invention, the video transmission unit stores the number of I picture data and a plurality of P picture data according to a request from the transmission line, and transmits the stored I picture data and P picture data as stream data of a GOP unit to the transmission line.

The present invention further provides a motion picture transmission system including: a video transmission unit for encoding a motion picture signal; a transmission line for transmitting video data encoded by the video transmission unit; and a video reception unit for receiving the video data transmitted via the transmission line, wherein the video transmission unit has a unit for generating at least an I picture data and a plurality of P picture data, and a unit for selecting the I picture data and a predetermined number of P picture data in accordance with a request from the transmission line.

In the motion picture transmission system according to the present invention, the transmission line is constructed by transmission lines of different transmission speeds of the video data, and the unit for selecting the I picture and a predetermined number of P picture data in accordance with a request from the transmission line includes a unit for changing the number of the P picture data in accordance with transmission speeds of the transmission lines and sending the changed number of the P picture data.

In the motion picture transmission system according to the present invention, the unit for changing the number of the P picture data in accordance with transmission speed of the transmission line and transmitting the changed number of the P picture data includes a unit for changing the number of P picture data subsequent to the I picture data.

In the motion picture transmission system according to the present invention, the image transmission unit further includes a memory unit, the memory unit stores a plurality of I picture data and a plurality of P picture data according to a request from the transmission line, and the video transmission unit converts the stored I picture data and P picture data into stream data of a GOP unit and transmits the stream data to the transmission line.

In the motion picture transmission system according to the present invention, the video reception unit is constructed by a plurality of video reception units, the plurality of video reception units are connected to transmission lines of different transfer speeds of the video data, the video transmission unit transmits a predetermined number of I picture data and P picture data in accordance with a request from each of the video reception units to each of the video reception units, and each of the video reception units reproduces a motion picture from each of the received I picture data and P picture data.

The present invention further provides a motion picture transmission apparatus including: a coding unit for converting a motion picture signal into at least an I picture data and a plurality of P picture data; a memory unit for storing the I and P picture data; an output unit for outputting the I and P picture data;

and a control unit for controlling the output unit, wherein the control unit controls the number of I picture data and the number of P picture data output from the output unit in accordance with a request from a transmission line.

In the motion picture transmission apparatus according to the present invention, a request from the transmission line is the I picture data and the P picture data of different numbers, and the control unit changes the number of the P picture data in accordance with a request from the transmission line and transmits the resultant.

In the motion picture transmission apparatus according to the present invention, in the case of changing the number of the P picture data and transmitting the resultant in accordance with a request from the transmission line, the number of P picture data subsequent to the I picture data is changed and the resultant is transmitted.

In the motion picture transmission apparatus according to the present invention, the memory unit stores a plurality of I picture data and a plurality of P picture data according to a request from the transmission line, and the control unit converts the stored I picture data and P picture data into stream data of the GOP unit and transmits the stream data from the output unit.

The above and other objects, features and advantages of the present invention will be apparent from the following detailed description of illustrative embodiments which is to be read in connection with the accompanying drawings.

BRIEF DESCRIPTION OF THE DRAWINGS

FIG. 1(a) is a diagram showing a data flow for explaining an embodiment of the present invention.

FIG. 1(b) is a diagram for explaining operation of a video transmission unit used in the present invention.

FIG. 2 is a diagram showing a data flow for explaining another embodiment of the present invention.

DETAILED DESCRIPTION OF THE ILLUSTRATED EMBODIMENTS

In the present invention, stream data from a compression processing unit of a video transmission unit is output as it is to a video reception unit connected to a network transmission line having higher transmission speed than the bit rate of the stream data from the compression processing unit. Only a part of stream data from the compression processing unit of the video transmission unit is output to a video reception unit connected to a network transmission line having transmission speed lower than the bit rate of the stream data which is output from the compression processing unit. Particularly, in the case of a compressing process conformed with an international standard encoding system such as MPEG-2 or MPEG-4, stream data is compressed using previous and subsequent pictures. Consequently, even when only a part of stream data is simply output from the compression processing unit, the video reception unit cannot reproduce the picture from a part of stream data received. Generally, a part of stream data which can be reproduced from itself is a part called an intra-frame coded part, an intra-picture, or an intra-VOP (video of plane). In the case of MPEG-2, the part corresponds to an I picture. In the case of MPEG-4, the part corresponds to an I-VOP (hereinbelow, the I-picture and the I-VOP will be generically called I pictures). Therefore, the video reception unit can reproduce an I picture of a stream by using only a part of stream data. Since it is information of only part of a stream, it can be transmitted to a network transmission line having a transmission speed lower than the bit rate of the whole stream. Thus, a network motion picture transmission system capable of reproducing a picture optimized to transmission speed of a network related to each of video reception units can be realized.

Figure 10:
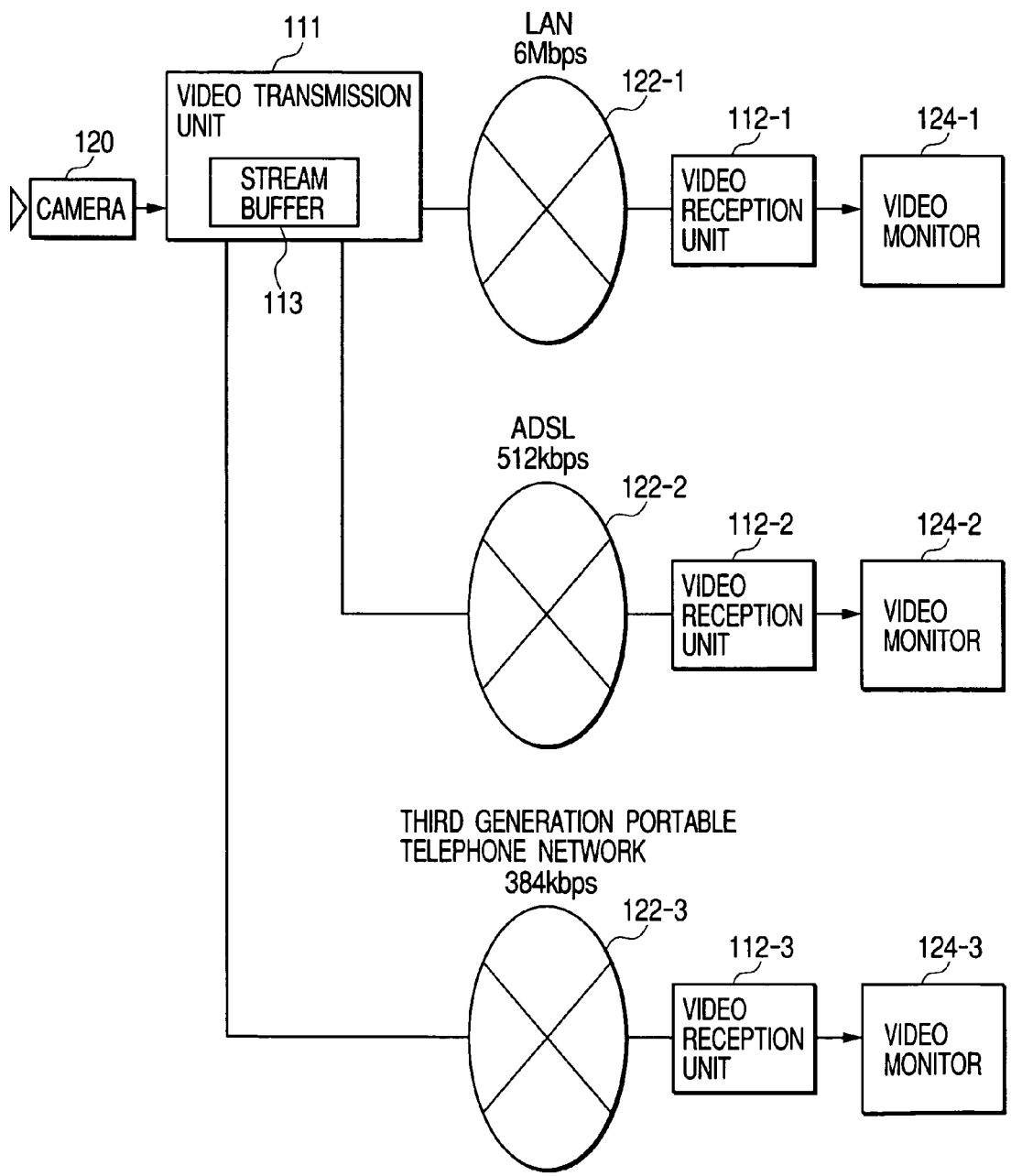
FIG. 10 is a block diagram showing a schematic configuration of a network video transmission system as an embodiment of the present invention.
Figure 12:
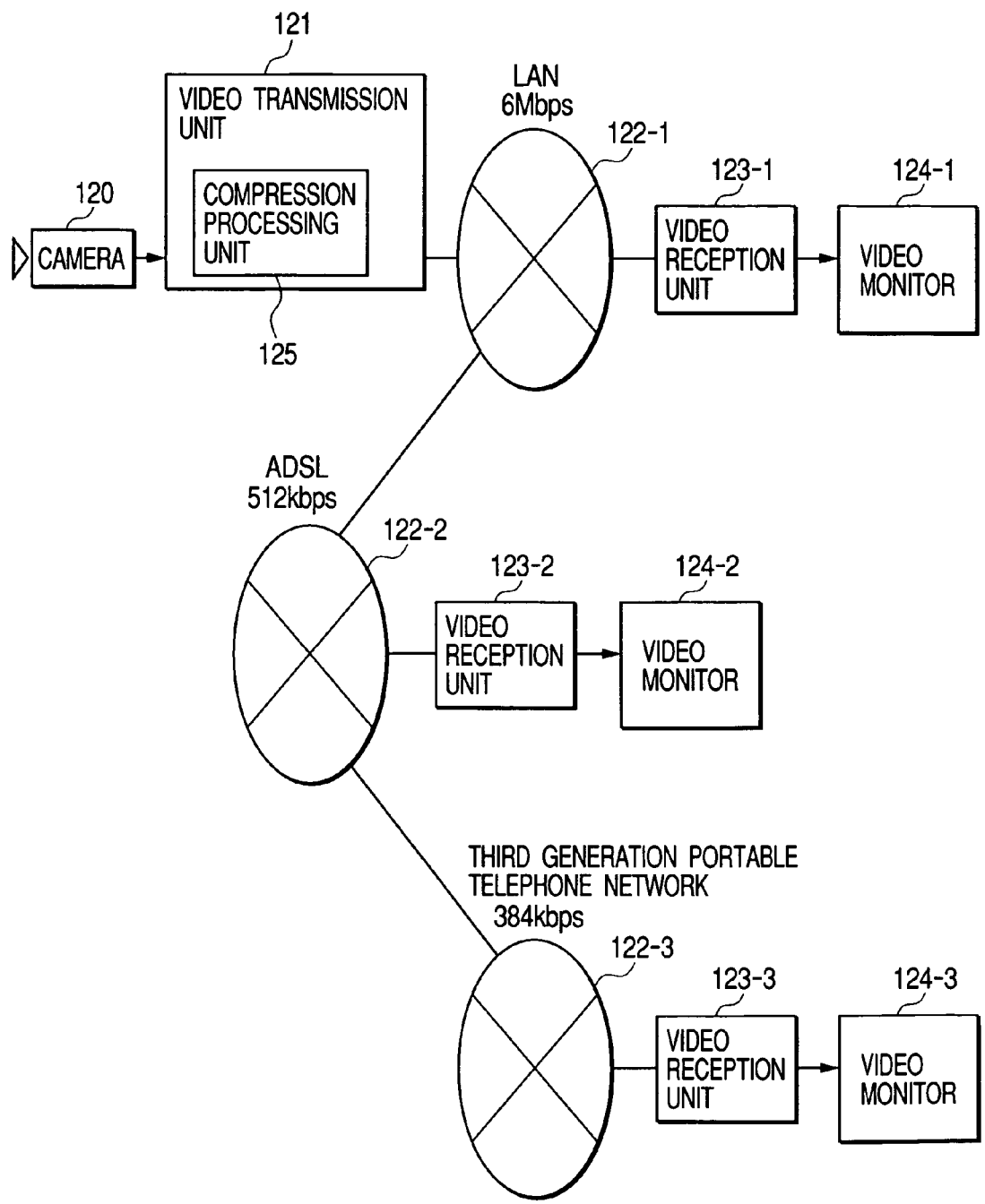
FIG. 12 is a block diagram showing a schematic configuration as an example of a conventional network video transmission system.

FIG. 10 is a block diagram showing a schematic configuration of an embodiment of the present invention. In FIG. 10, the same components as those in FIG. 12 are designated by the same reference numerals. Reference numeral 111 denotes a video-transmission unit, and the networks 122-1, 122-2, and 122-3 are connected so that an output from the video transmission unit 111 is directly supplied to each of the networks. A transmission system of such parallel connection is called a unicast configuration. The unicast configuration will be described hereinbelow.

Figure 3:
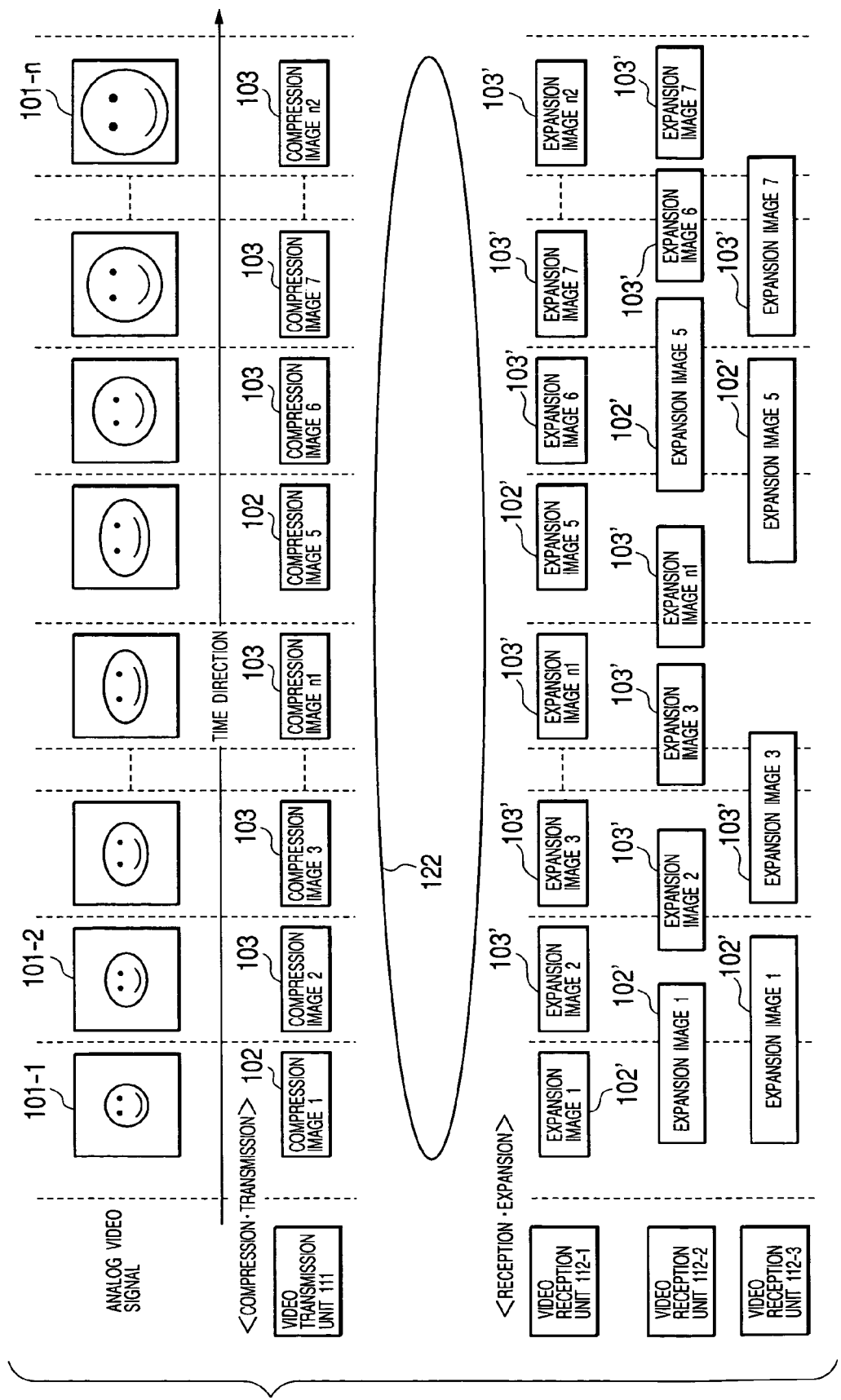
FIG. 3 is a diagram showing a data flow for explaining further another embodiment of the present invention.

The operation of the invention shown in FIG. 10 will be described with reference to FIG. 3. FIG. 3 is a diagram showing a data flow for explaining a first embodiment of a video distributing method of the present invention. Although it has been described that stream data of the MPEG system is constructed by I pictures, P pictures, and B pictures, for convenience of explanation, description will be made by using only the I and P pictures.

In FIG. 3, analog video signals 101-1, 101-2, ..., and 101-*n* from the camera 120 are subjected to coding based on the MPEG-4 in the time direction shown by the arrow, thereby generating I pictures 102 and P pictures 103 by the video transmission unit 111. The generated I and P pictures 102 and 103 are stored in a stream buffer 113 in the video transmission unit 111. The operation of the video transmission unit 111 and video reception units 112-1, 112-2, and 112-3 will be described hereinbelow with reference to the diagrams.

The video reception unit 112-1 requests the video transmission unit 111 for stream data via the network 122 (122-1 in FIG. 10). The video transmission unit 111 transmits the I picture 102 (hereinbelow, called a compression image 1) to the video reception unit 112-1 which has requested for stream data via the network 122-1. The video reception unit 112-1 which receives the I picture 102 (compression image 1) immediately decompresses the stream data, thereby obtaining an I picture 102' (hereinbelow, called an expansion image 1). The video reception unit 112-1 sends a request for the next stream data to the video transmission unit 111 via the network 122-1. The video transmission unit 111 transmits the next picture 103 (compression image 2) to the video reception unit 112-1 which has requested for the stream data. The video reception unit 112-1 which receives the P picture 103 (compression image 2) immediately decompresses the stream data, thereby obtaining a P picture 103' (expansion image 2). The following P pictures 103 (compression images 3, ..., and n1) are also requested by the same procedure and received compression images are decompressed as P pictures 103' (expansion images 3, ..., and n1). After that, the same procedure is repeated for each request for stream data.

The video reception unit 112-2 also sends a request for stream data to the video transmission unit 111 via the network 122 (122-2 in FIG. 10). The video transmission unit 111 transmits the I picture 102 (compression image 1) to the video reception unit 112-2 which has requested the stream data.

The video reception unit 112-2 receives the I picture 102 (compression image 1) delayed according to the line speed (transmission speed of the network) and immediately decompresses the stream data, thereby obtaining the I picture 102' (expansion image 1). The video reception unit 112-2 sends a request for the next stream data to the video transmission unit 111 via the network 112-2. The video transmission unit 111 transmits the next P picture 103 (compression image 2) to the video reception unit 112-2 which has requested for the stream data. After that, the video reception unit 112-2 requests for the following P pictures 103 (compression images 3, ..., and n1) in a similar manner, receives stream data which is transmitted, and decompresses the stream data. The operation is repeated.

As described above, like the video reception unit 112-2 connected via the network 122-2, the video reception unit 112-2 which receives the P picture 103 (expansion image 2) delayed according to the line speed sequentially requests for the I pictures 102 (compression images 1) and the P pictures 103 (compression images 2, 3, ..., and n1) and receives the pictures. The video reception unit 112-2 sequentially decompresses the received pictures to thereby obtain the I pictures 102' (expansion images 1) and the P pictures 103' (expansion images 2, 3, ..., and n1).

Through the operation, as shown in FIG. 3, the delay time between the input picture and the decompressed picture gradually increases.

The video reception unit 112-3 sends a request for stream data to the video transmission unit 111 via the network 122-3 whose transmission speed is lower than that of the video reception unit 112-2. The video transmission unit 111 transmits the I picture 102 (compression image 1) to the video reception unit 112-3 which has requested for the stream data via the low-speed network 122-3.

The video reception unit 112-3 which has received the I picture 102 (compression image 1) delayed according to the low-speed transmission speed immediately decompresses the stream data, thereby obtaining the I picture 102' (expansion image 1). After that, the video reception unit 112-3 sends a request for stream data to the video transmission unit 111 via the low-speed network 122-3.

The video transmission unit 111 transmits the P picture 103 (compression image 3) which is available at the time point of the request to the video reception unit 112-3 which has requested for the stream data. After that, the stream data is requested by the same procedure and reception and decompression is repeated.

After the I picture 102 (compression image 1) is received and decompressed to thereby obtain the I picture 102' (expansion image 1), the video reception unit 112-3 receives the P picture 103 (compression image 3) at a timing the P picture 103 (compression image 3) is generated as shown in FIG. 3 and decompresses the picture, thereby obtaining the P picture 103' (expansion image 3) As a result, the immediately preceding P picture 103 (compression image 2) is not received and is dropped, so that the expansion image 3 is not reproduced accurately. As described above, a reproduction image in which the immediately preceding P picture 103 (compression image 2) is dropped is displayed in a block distorted state.

As described above, when the transmission speed of the network used is low, transmission of the expansion image is delayed and block distortion occurs in the expansion image.

In MPEG-4 stream distribution via a network using a transmission line having low line speed, even if the processing speed of the video reception unit 112 is increased, due to low capability of the data transmission line, the video reception unit 112 cannot receive and decompress stream data at proper timings corresponding to the intervals of MPEG-4 coding performed by the video transmission unit 111. Consequently, when the video reception unit 112 continuously receives and decompresses stream data which is MPEG-4 coded by the video transmission unit 111, a time difference occurs between the compression image of the video transmission unit 111 and the expansion image of the video reception unit 112. The time difference gradually increases.

Further, in the case where the video transmission unit 111 transmits a picture to the video reception unit 112-3 which has requested for stream data, since the video reception unit 112-3 uses the lower-speed transmission line 112-3, even in the case of transmitting the latest stream data, a dropout occurs in a received compression image. Due to this, discontinuous stream data is decompressed and block distortion occurs in a reproduced image.

A second embodiment of the present invention is directed to solve such a problem. A stream of I and P pictures is controlled on the video transmission unit 111 side also in a network using a low-speed transmission line, the number of P pictures to be transmitted subsequent to the I picture is notified to the video transmission unit 111, and corresponding stream data of the GOP (Group Of Picture) unit is received from the video transmission unit 111.

Specifically, in the video transmission unit 111, stream data is accumulated until the number of P pictures reaches the requested predetermined number of P pictures from the latest I picture 102 (for example, a compression image 5). At the time point when accumulation is achieved, the I picture and the subsequent predetermined number of P pictures are processed on the GOP unit basis and the resultant is transmitted to the video reception unit 112, thereby enabling an arbitrary stream data amount to be designated in accordance with the line state, so that the efficiency of the line can be maximally used.

The operation of the second embodiment of the present invention will be described with reference to FIGS. 1(a), 1(b), 2, 4, and 5.

First, a state of distributing stream data of the GOP unit basis of the video transmission unit 111 in the invention will be described with reference to FIGS. 1(a) and 1(b).

FIG. 1(a) shows a data flow of a video signal in a manner similar to the image distributing method shown in FIG. 3. The reference numerals of components correspond to those of the same components in FIG. 3. FIG. 1(b) is a diagram for explaining the operation of the video transmission unit 111. Reference numeral 114 denotes a stream buffer controller for controlling the stream buffer 113 shown in FIG. 10.

The video transmission unit 111 performs MPEG-4 coding in the time base direction on the analog video signals 101-1, 101-2, . . . , and 101-n from the camera 120 to thereby generate the I pictures 102 and the P pictures 103 (shown in FIG. 3) and stores the generated pictures into the stream buffer 113 in the video transmission unit 111. The operation will be described in more detail by using FIG. 1(b). The stream buffer 113 in the video transmission unit 111 is a memory for storing the I and P pictures, and the pictures are stored in Group 1 and Group 2 as shown in the diagram. In Group 1, the compression image 1 as the I picture and the compression images 2, 3, . . . , and n1 as the P pictures are stored. In Group 2, the compression image as the I picture and compression images 6, 7, . . . , and n2 as the P pictures are stored. Each of Groups 1 and 2 is constructed on the GOP unit basis. The number of groups is not limited to 2 but may be set to be larger than 2. The processing operation of the video transmission unit 111 at the time of storing the I picture and the P pictures into the stream buffer 113 will be described with reference to the flowchart of FIG. 4.

Figure 4:
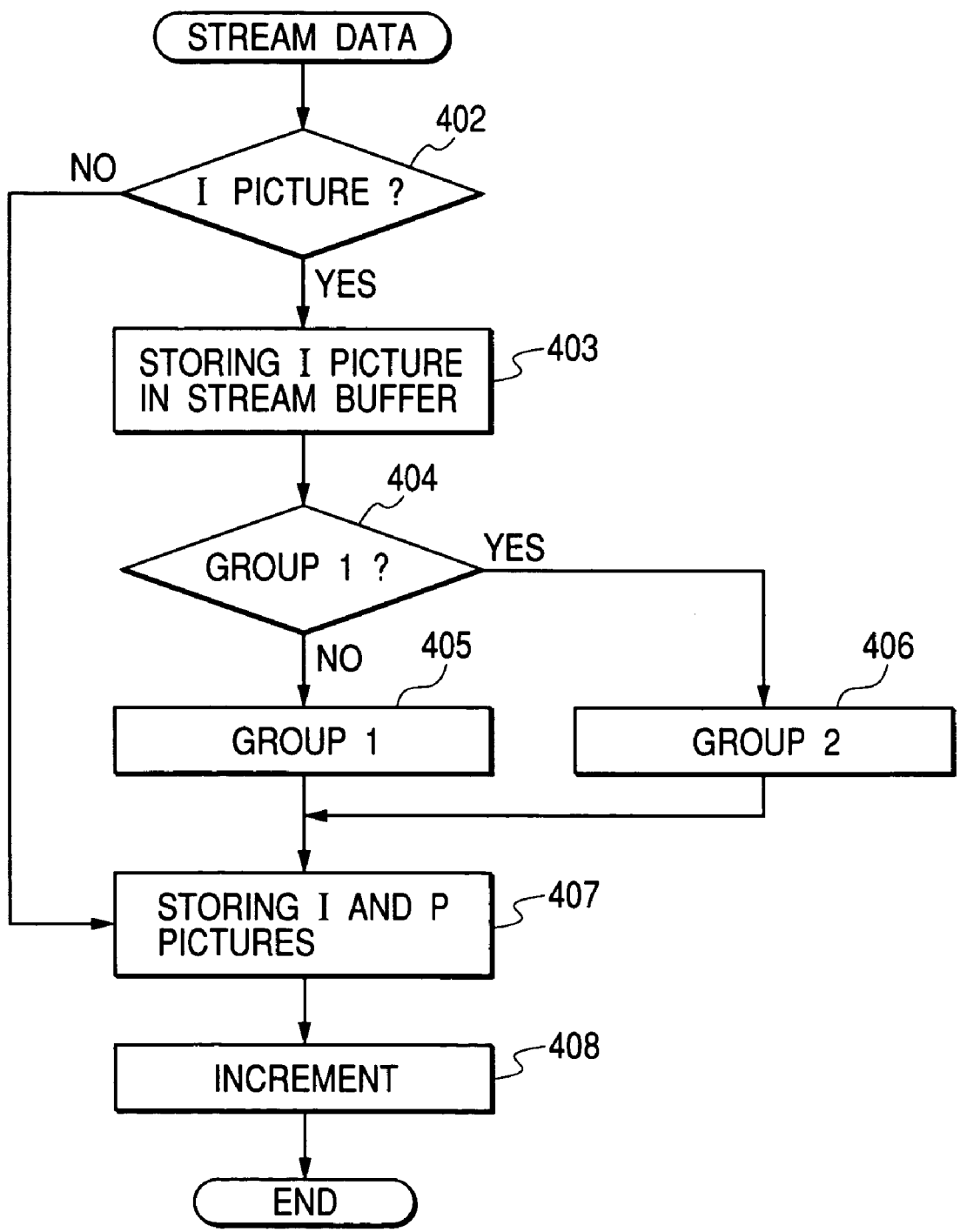
FIG. 4 is a flowchart showing an example of a processing operation of a video transmission unit at the time of storing I and P pictures in the present invention.

In FIG. 4, in the case of storing stream data, first, in step 402, whether stream data to be stored is an I picture or a P picture is determined. In the case of an I picture, the program advances to step 403. In the case of a P picture, the program advances to step 407.

In step 403, the I picture is stored in an I picture storage position in the stream buffer 113, for example, in a position indicated by the compression image 1 or 5.

In step 404, a group in the stream buffer 113, which is being read, that is, from which an image is being distributed or hot is determined. For example, if the group 1 is being used at present, the program advances to step 406. If the group 2 is being used, the program advances to step 405.

In step 405, the group 1 in the stream buffer 113 is selected, and the program advances to step 407. In step 406, the group 2 in the stream buffer 113 is selected, and the program advances to step 407.

In step 407, the I and P pictures are stored in the selected group 1 or 2.

In step 408, as shown in FIG. 1(b), the storage position of each picture shifts as shown by the arrows, and the storage position in the stream buffer is incremented one by one. Selection between the groups 1 and 2 and selection of the storage position in the stream buffer are made by the stream buffer controller 114.

Figure 5:
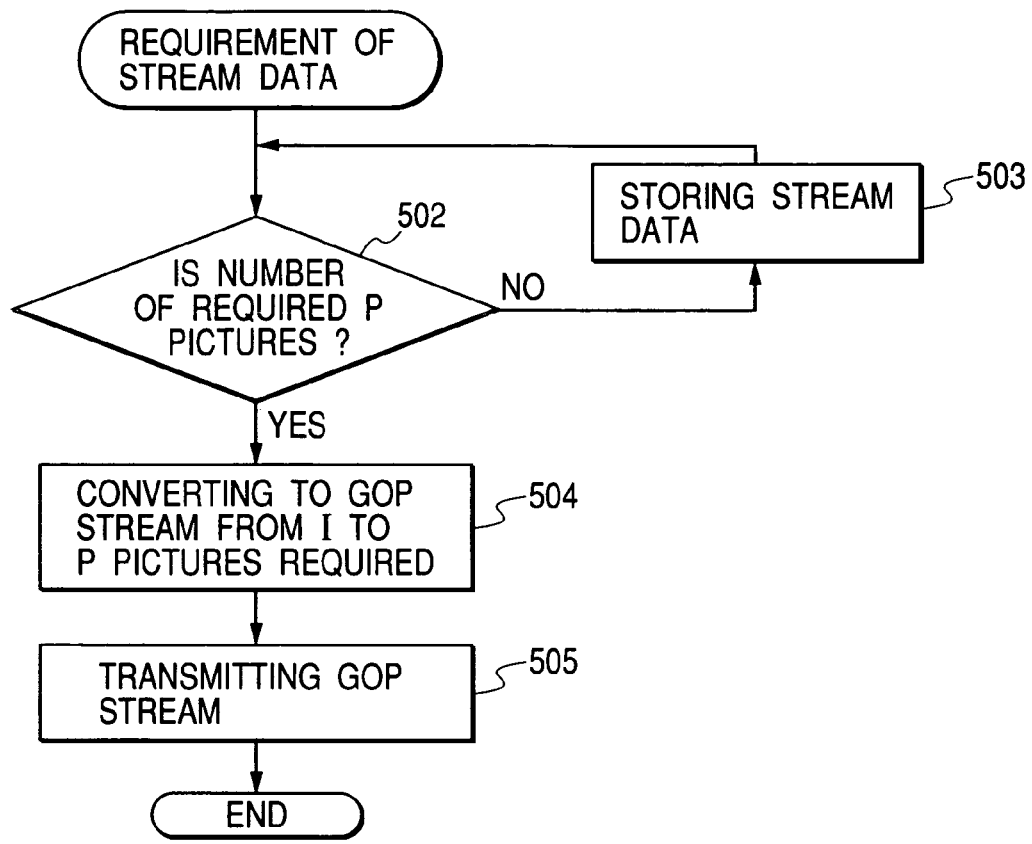
FIG. 5 is a flowchart showing an embodiment of a processing operation of the video transmission unit at the time of transmitting the I and P pictures of the present invention.

The processing operation of the video transmission unit 111 at the time of distributing (transmitting) the I and P pictures in the second embodiment of the present invention will now be described with reference to the flowchart of FIG. 5. In FIG. 5, in the case where the video transmitting unit 111 receives a stream data transmission request from a video reception unit (for example, the video reception unit 112-1), in step 502, the requested number of P pictures from the video reception unit 112-1 is determined. If stream data stored in the stream buffer 113 is less than the requested number, the program is branched to step 503. If stream data stored in the stream buffer 113 satisfies the requested number of P pictures, the program advances to step 504.

In step 503, in order to continue storage of stream data, the program returns to step 502. In step 504, the requested number of P pictures subsequent to the I picture are processed on the GOP unit basis, and the program advances to step 505.

In step 505, the stream data is transmitted to the video reception unit 112-1 on the GOP unit basis.

FIG. 2 is a diagram for explaining the operation in a reception state of the video reception unit 112-1 of the stream data on the GOP unit basis distributed from the video transmission unit 111 according to the second embodiment of the present invention. The same components as those in FIG. 3 are designated by the same reference numerals. In FIG. 2, the video reception unit 112-1 receives and decompresses the I picture 102' (expansion image 1) and the P pictures 103' (expansion images 2, 3 . . . , and n1) processed to stream data of the GOP unit by the video transmission unit 111. Operations in the video reception units 112-2 and 112-3 are similar to that of the video reception unit 112-1 and will not be described here.

According to the embodiment as described above, MPEG-4 stream delay time between the video transmission unit and the video reception unit is minimized in accordance with the transmission speed of a network used to thereby assure continuity of the stream. The requested number of P pictures are converted to stream data on the GOP unit basis and the resultant stream data can be distributed.

A third embodiment of the present invention will now be described. In the third embodiment, also in the case of using a network of a low-speed transmission line, stream data of the I and P pictures is managed on the video transmission unit 111 side. Transmission history of the I and P pictures transmitted to the video reception unit 112 which made a request is managed by the video transmission unit 111.

When the latest I picture is generated by the video transmission unit 111, history of transmission to the video reception units 112 (for example, the video reception units 112-1, 112-2, and 112-3) is initialized. When the next request is made from the video reception unit 112, pictures are transmitted from the next I picture 102 (compression image 5), thereby minimizing delay time between the video transmission unit 111 and the video reception unit 112.

Continuity of stream data can be further assured, and problems such as those of the video reception unit 112 in the first embodiment of the present invention can be also solved.

Figure 6:
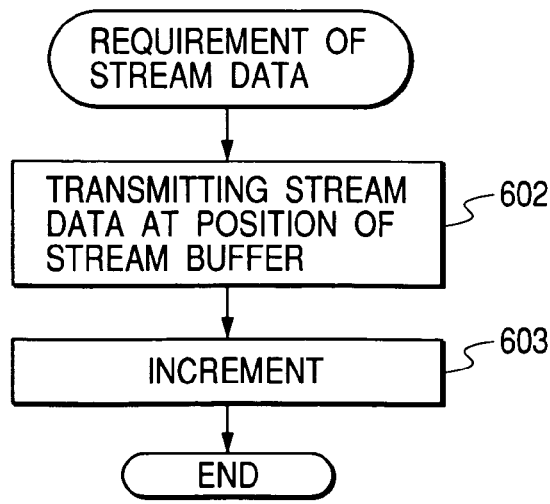
FIG. 6 is a flowchart showing another embodiment of the processing operation of the video transmission unit at the time of transmitting the I and P pictures of the present invention.

The third embodiment of the present invention will be described by taking, as an example, processing operation of the video transmission unit 111 at the time of distributing (transmitting) the I and P pictures in FIG. 2 in the second embodiment with reference to the flowchart of FIG. 6. In FIG. 6, in the case where a request for transmitting stream data from the video reception unit 112 is made, in step 602, stream data indicated by a transmission buffer position in the video transmission unit 111 is transmitted. In step 603, the position of the stream buffer 113 in the video transmission unit 111 is updated.

Figure 7:
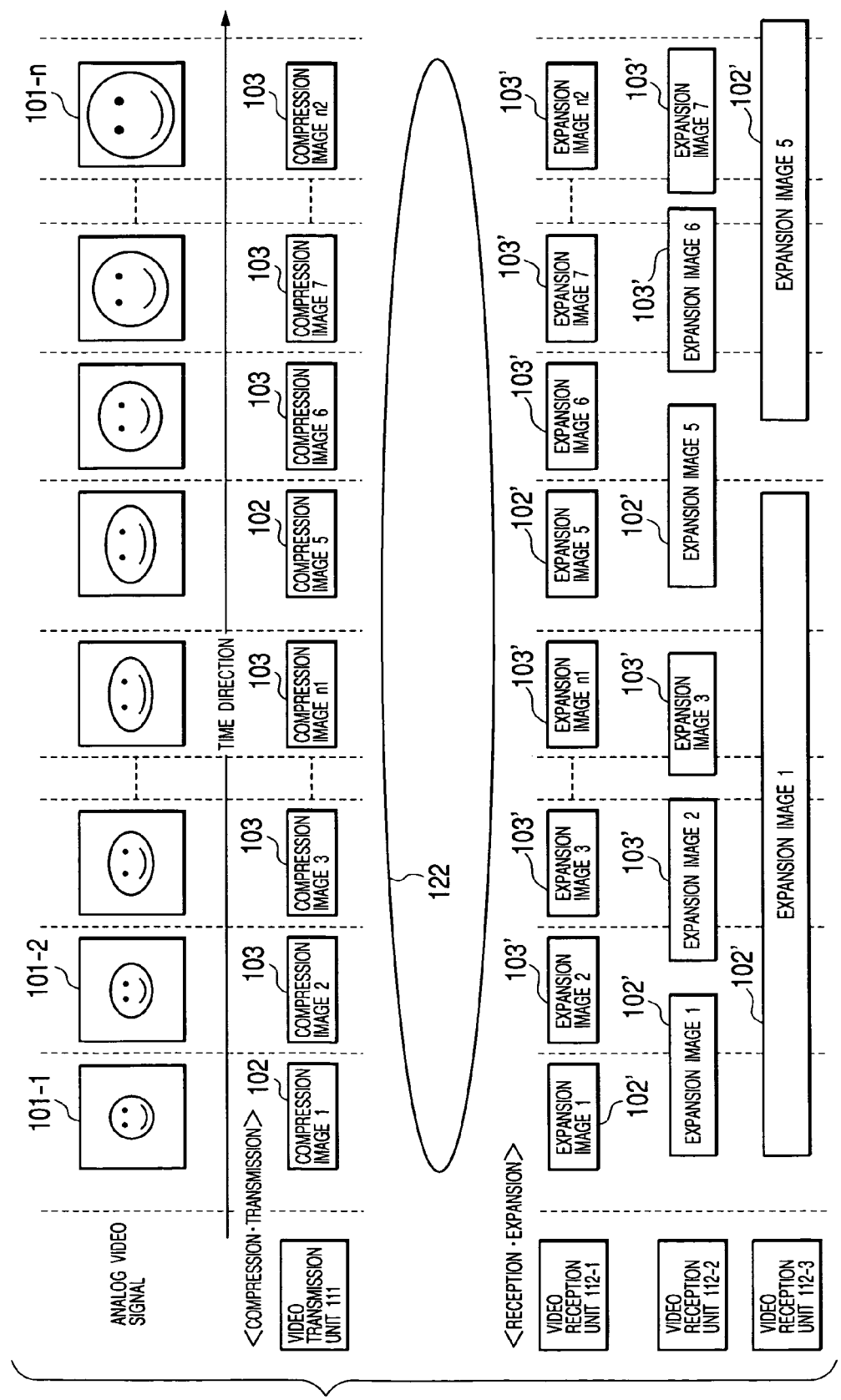
FIG. 7 is a diagram showing a data flow for explaining another embodiment of the present invention.

FIG. 7 is a diagram showing a data flow for explaining the operation of the video transmission unit of the third embodiment of the present invention. The same components as those of FIG. 3 are designated by the same reference numerals. FIG. 7 shows a case where there is a lag in reception time of stream data distributed from the video transmission unit 111, in the video reception unit 112-2. In the case where a request for transmitting the next stream data is sent from the video reception unit 112-2 to the video reception unit 112-2 after the P picture 103 (compression image 3) is received and decompressed, thereby obtaining the P picture 103' (expansion image 3), the video transmission unit 111 distributes the I picture 102 (compression image 5) without distributing the P picture 103 (compression image n1), thereby enabling the time lag between the video transmission unit 111 and the video reception unit 112-2 to be regulated to the minimum.

FIG. 7 also shows the case where reception time of, stream data distributed from the video transmission unit 111 corresponds to the next I picture 102 (compression image 5), in the video reception unit 112-3. This case indicates that even the subsequent P pictures 103 (compression images 2, 3, ..., and n1) are received, there is no time to decompress them. Therefore, considering time of the request for transmitting stream data from the video reception unit 112-3, the video transmission unit 111 transmits the next I picture 102 (compression image 5) without transmitting the P picture 103. In such a manner, the video reception unit 112-3 can receive the I picture 102 (compression image 5), so that the picture can be displayed.

As described above, according to the embodiment, by changing the distribution amount of stream data of MPEG-4 or the like in accordance with the transmission speed of a communication line such as an analog line, the Internet, an intranet, or a dedicated line, stream data can be received by any of the video reception units 112 connected to transmission lines of different transmission speeds as pictures of the GOP unit which can be reproduced consecutively.

The foregoing embodiments have been described that in the case where a transmission line of high transmission speed and a transmission line of low transmission speed mixedly exist, at the time of transmitting stream data from the video transmission unit 111 to the transmission line of low transmission speed, by properly reducing the P pictures 103 in the video transmission unit 111 and transmitting the resultant, stream data adapted to the transmission speed of the transmission line is transmitted to the video reception unit 112. In the case of carrying out the method, however, if part of coded data is simply reduced, the following problem occurs.

Figure 8:
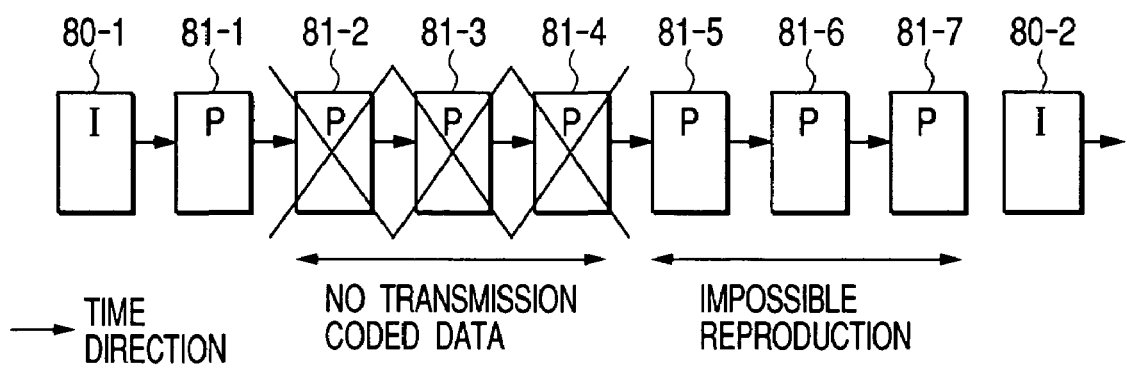
FIG. 8 is a principle explaining diagram for explaining further another embodiment of the present invention.

FIG. 8 is a diagram for explaining the problem. In FIG. 8, reference character I indicates I pictures 80-1 and 80-2, and reference character P denotes P pictures 81-1, 81-2, ..., and 81-7. As described above, the B picture is not shown for convenience of explanation. For example, MPEG-4 is based on interframe predictive coding and is constructed by the periodic I pictures 80 and predictive-coded P pictures 81. If all of the I and P pictures cannot be transmitted due to transmission speed of a transmission line as shown in FIG. 8, either the I or P picture has to be reduced. As described above, a picture can be reproduced only from the I picture. However, since the P picture is data of the difference between the present image data and the immediately preceding image data, the P picture cannot be reproduced by itself.

In the case of transmitting data while dropping part of the P pictures, although the data is transmitted, a problem occurs such that a P picture after the dropped P picture cannot be reproduced since there is no immediately preceding image data. For example, in the case of dropping three P pictures, for example, the P pictures 81-2, 81-3, and 81-4 (as shown by the "X" mark in FIG. 8), the subsequent P pictures 81-5, 81-6, and 81-7 cannot be reproduced. However, the I picture is coded without prediction using the immediately preceding frame, even when the immediately preceding data is eliminated, a picture can be reproduced only from the I picture 80-2 itself.

Figure 9:
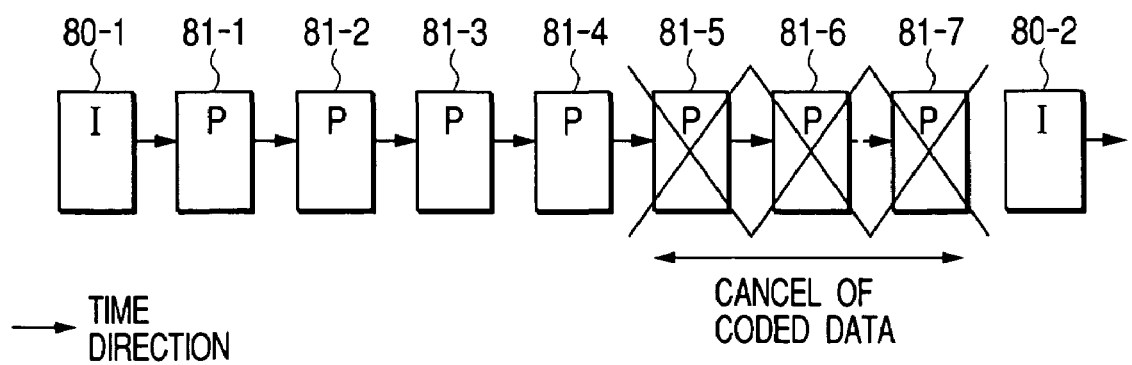
FIG. 9 is a principle explaining diagram for explaining further another embodiment of the present invention.

FIG. 9 is a diagram for explaining another embodiment of the present invention. The same components as those of FIG. 8 are designated by the same reference numerals. In the present invention, attention is paid to the fact that an image can be reproduced from an I picture even when data (P picture) is partially dropped. In the case of dropping a predetermined number of P pictures, P pictures of the predetermined number immediately preceding an I picture are dropped. Specifically, in the case of dropping, for example, three P pictures as shown in FIG. 9, the P pictures 81-5, 81-6, and 81-7 immediately preceding the I picture are dropped. The number of P pictures to be dropped changes according to the transmission speed of a transmission line used. In other words, by employing a transmission rate adaptive packet transmission method, also in a system including transmission lines or networks of different transmission speeds, a motion picture can be properly distributed.

Figure 11:
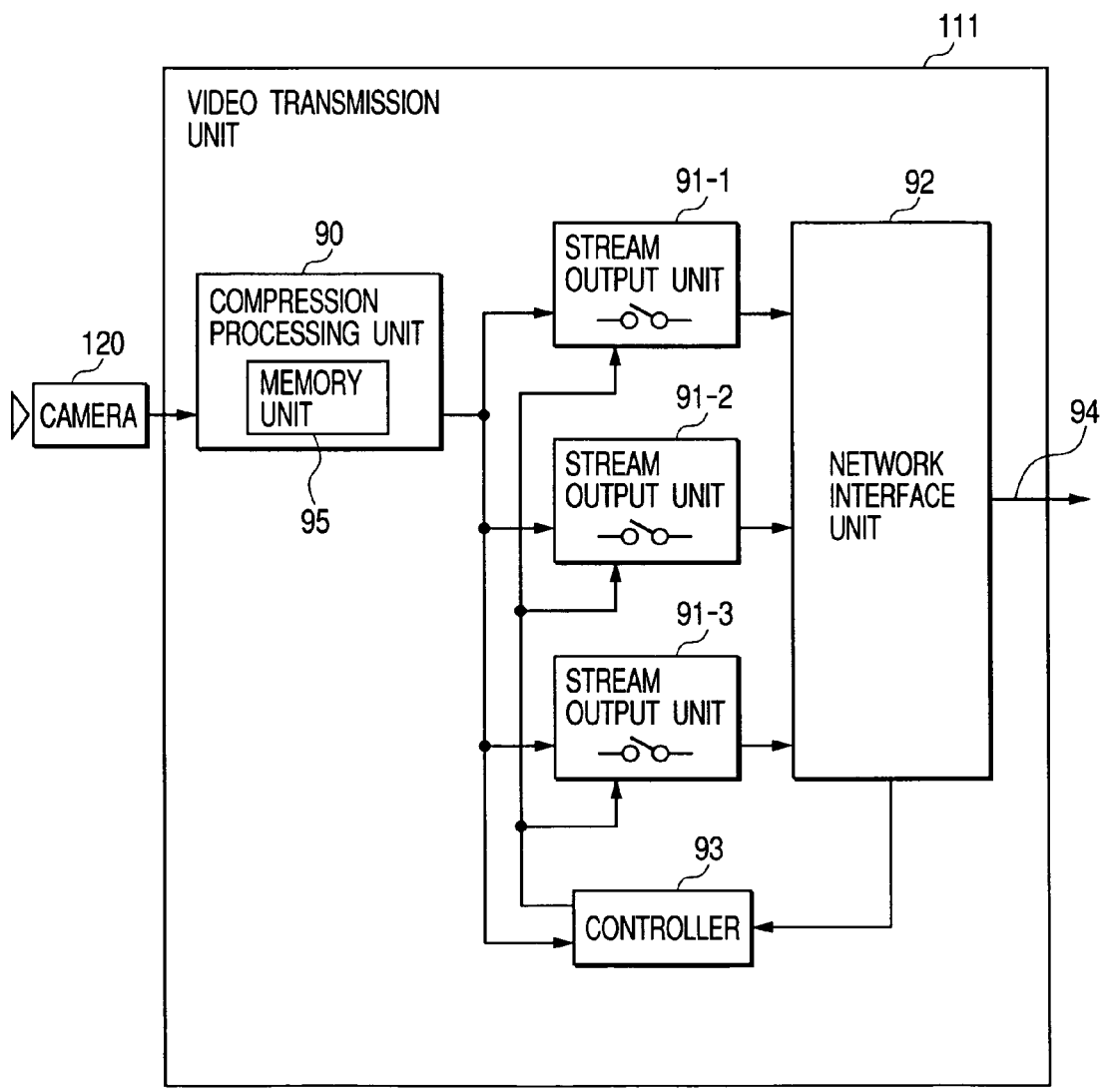
FIG. 11 is a block diagram showing a concrete configuration of a video transmission unit as an embodiment of the present invention.

FIG. 11 is a block diagram showing a schematic configuration of an embodiment of the video distribution unit 111 used in the present invention. In FIG. 11, a video signal is supplied from the camera 120 to the video transmission unit 111. The video transmission unit 111 has therein a compression processing unit 90, stream output units 91-1, 91-2, and 91-3, a network interface unit 92, and a controller 93. The compression processing unit 90 encodes an input video signal into I and P pictures by MPEG-2 or MPEG-4 coding and stores the resultant into a memory unit 95. On the other hand, the encoded stream data is supplied to the stream output units 91-1, 91-2, and 91-3.

The operation of the stream output units 91-1, 91-2, and 91-3 is controlled by a control signal from the controller 93, and outputs from the stream output units 91-1, 91-2, and 91-3 are output to the network interface unit 92. The network interface unit 92 performs packet-multiplexing on the outputs and distributes the resultant as stream data 94 to the video reception unit 112 via the networks 122. Since the stream data 94 is connected to a network (shown in FIG. 10), generally, the packet-multiplexing of IP packets or the like is performed. Although FIG. 11 shows the three stream output units 91, it is because three video reception units 112 are connected as shown in FIG. 10 and the number is not limited to three.

The operation of FIG. 11 will now be described. It is assumed that stream data encoded by the compression processing unit 90 is MPEG-2 stream data which is compressed to 2 Mbps. As described above, the stream data compressed according to the MPEG-2 encoding is compressed in three different encoding modes picture by picture. The stream data is constructed by an I picture, a P picture, and a B picture. Since the rate of a video signal is 30 frames/second, 15 pictures are repeated twice per second. Therefore, the number of I pictures, P pictures, and B pictures per second are expressed as follows.

| | |
|---|---|
| I pictures: | 2 |
| P pictures: | 8 |
| B pictures: | 20 |

The ratio of encoding amounts of the pictures is, although it depends on complexity of a picture, approximately as follows.

$$I:P:B=10:7:5 \quad (1)$$

In the case where the rate as a whole is 2 Mbps and the bit rate of only the I pictures 80-1 and 80-2 is calculated at the ratio (1), the following equation (2) is obtained.

$$227 \text{ Kbps}=2 \text{ Mbps}\times((10\times2)/(10\times2+7\times8+5\times20)) \quad (2)$$

When the bit rate used at the time of transmitting the I pictures 80-1 and 80-2, each I picture having one P picture, that is, total two I pictures and two P pictures are calculated at the ratio of (1), the following equation (3) is obtained.

$$386 \text{ Kbps}=2 \text{ Mbps}\times((10\times2+7\times2)/(10\times2+7\times8+5\times20)) \quad (3)$$

It is understood that the bit rate of a picture to be transmitted can be changed according to the number of P or B pictures transmitted as described above.

The operation in FIG. 11 will now be described. In response to the control signal of the controller 93, for example, stream data output from the stream output unit 91-1 is transmitted at a bit rate of stream data from the compression processing unit 90, that is, 2 Mbps to the video reception unit 112-1 via the network interface unit 92 and the LAN 122-1.

The stream output unit 91-2 selects the I picture and subsequent one P picture on the basis of the control of the controller 93, that is, the equation (3) and transmits the pictures to the video reception unit 112-2 via the network interface unit 92 and the ASDL 122-2 at a bit rate of 386 Kbps.

Further, the stream output unit 91-3 selects only two I pictures on the basis of the control of the controller 93, that is, the equation (2) and transmits the pictures to the video reception unit 112-3 via the network interface unit 92 and the third generation portable telephone network 122-3 at a bit rate of 227 Kbps.

To the controller 93, a signal according to the transmission rate of the transmission line 122 is supplied from the network interface unit 92. According to the transmission rate, the controller 93 controls the amount of data transmitted from the stream output units 91-1, 91-2, and 91-3, thereby realizing so-called transmission rate adaptive packet transmission.

As described above, according to the present invention, stream data of different bit rates such as 2 Mbps, 386 kbps, and 227 kbps can be distributed to networks having different transmission rates, and the video reception unit for receiving the stream data can reproduce a desired optimum motion picture.

Figure 13:
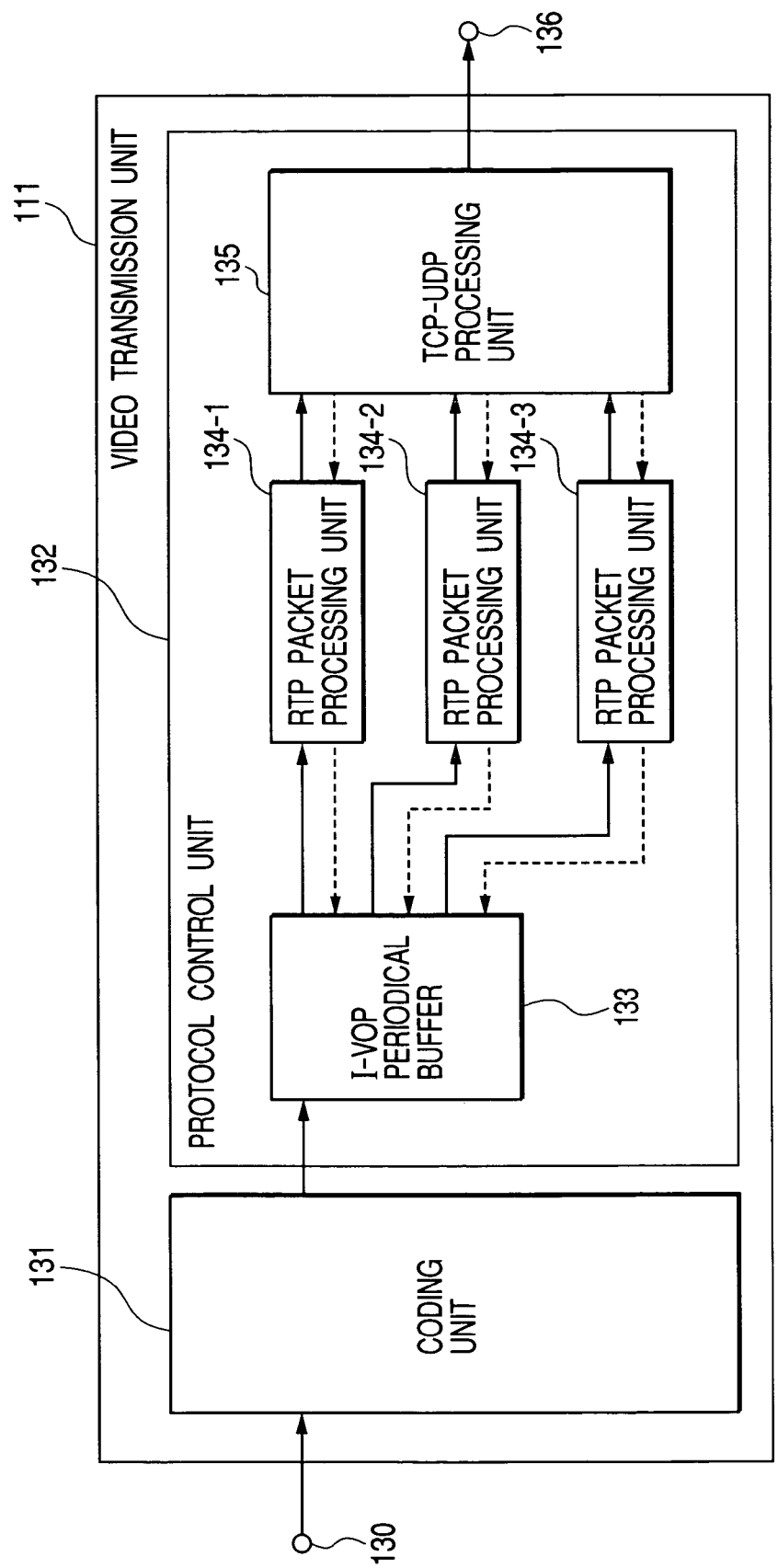
FIG. 13 is a block diagram showing a concrete configuration of another embodiment of the video transmission unit as an embodiment of the present invention.

FIG. 13 is a block diagram showing a schematic configuration of another embodiment of the video transmission unit 111 used in the present invention. In FIG. 13, a video signal from the camera 120 is input to the video transmission unit 111 via an input terminal 130. The video transmission unit 111 has therein a coding unit 131 and a protocol control unit 132. Although the coding unit 131 will be described as an MPEG-4 coding unit in the embodiment, the present invention is not limited to the MPEG-4 coding unit. The coding unit 131 may be a coding unit of another standard such as MPEG-2. The protocol control unit 132 includes an I-VOP periodical buffer 133, RTP (real time transport protocol) packet processing units 134-1, 134-2, and 134-3 and a TCP (transmission control protocol)-UDP (user datagram protocol) processing unit 135. An output of the TCP-UDP processing unit 135 is transmitted from an output terminal 136 to each of the networks 122. Although three RTP packet processing units are shown here, it is because that there are three kinds of transmission lines 122 of different transmission speeds in the case of the embodiment, and the number is not limited to three.

By constructing the protocol control unit 132 as described above, transmission rate adaptive packet transmission is realized. The configuration will be described in detail hereinbelow. The I-VOP periodical buffer 133 is a buffer having a capacity capable of storing at least coded data from an I-VOP (corresponding to the above-described I picture) to coded data just before the next I-VOP.

The RTP packet processing unit 134 generates a packet adapted to transmit data such as MPEG-4 coded data on a network. Specifically, according to the basic specifications of RTP, coded data is processed to one to a few packets every VOP and the packet is output to the following TCP-UDP processing unit 135.

The TCP-UDP processing unit 135 transmits an RTP packet to the network 122 in accordance with either a connection-type TCP protocol or a connectionless-type UDP protocol. The protocol can be selected by the user by remote setting of a personal computer or the like.

The protocol control unit 132 performs software processing mainly by a processor. The RTP packet processing unit 134 operates only by the number corresponding to the number of the video reception units 112 connected to transmission lines in order to simultaneously distribute data by unicast.

The MPEG-4 coding unit 131 receives a video signal, outputs MPEG-4 coded data, and writes the coded data into the I-VOP periodical buffer 133. The RTP packet processing unit 134 reads coded data from the I-VOP periodical buffer 133 by a ready signal (signal indicated by a broken line in FIG. 13) according to the transmission rate from the TCP_UDP processing unit 135. Specifically, the RTP packet processing units 134-1, 134-2, and 134-3 read data of amounts according to the transmission line rates (transmission speeds) from the I-VOP periodical buffer 133, and transmit them to the video reception units 112-1, 112-2, and 112-3, respectively. Therefore, video data is naturally discarded in the I-VOP periodical buffer 133 with respect to a low-rate transmission line. In such a manner, video data is automatically transmitted in accordance with the transmission speed of a transmission line.

A method of generating a ready signal according to the transmission rate by the TCP-UDP processing unit 135 varies according to a selected protocol. In the case of the TCP protocol, since it is of the connection type, a ready signal according to the transmission rate can be automatically generated by a response to the transmission packet from the coding unit 131.

On the other hand, in the case of the UDP protocol, since it is of the connectionless type, a ready signal cannot be automatically generated. Therefore, packet discard ratio information which is periodically transmitted from the video reception unit 112 is collected by the TCP-UDP processing unit 135. From the periodical information, the TCP-UDP processing unit 135 controls a packet transmission rate so that the packet discard ratio becomes zero, and generates a ready signal according to the transmission rate. In such a manner, a ready signal according to the transmission rate can be generated.

Figure 14:
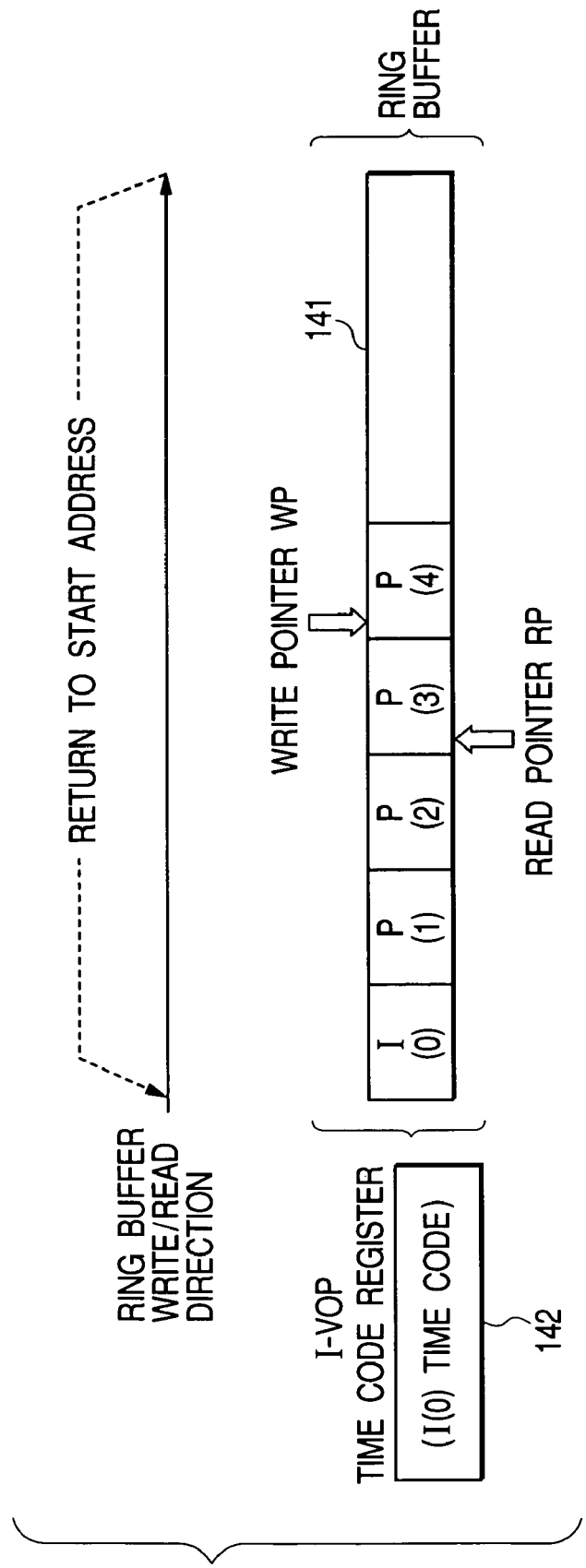
FIG. 14 is a diagram for explaining the operation of the video transmission unit shown in FIG. 13.

Control of the I-VOP periodical buffer 133 will now be described with reference to FIG. 14. The I-VOP periodical buffer 133 is constructed by a ring buffer 141 and an I-VOP time code register 142. Basically, coded data from the MPEG-4 coding unit 131 is sequentially written into the ring buffer 141 and is sequentially read by the RTP packet processing unit 134. In FIG. 14, the ring buffer 141 performs a general ring buffer operation in which the write and read directions are the same and operation returns to the start address after the final address.

In the I-VOP time code register 142, at the time point of writing I-VOP (displayed as "I" in the diagram) into the ring buffer 141, a time code is calculated on the basis of time information of the header of I-VOP and stored. The second and subsequent I-VOP time codes are overwritten in the I-VOP time code register 141. By the operation, the latest I-VOP time code written in the ring buffer 141 is always stored in the I-VOP time code register 141.

FIG. 14 shows a state where P(4) is written in the ring buffer 141 by a write pointer WP and P(3) is read by a read pointer RP, and the time code of I(0) is stored in the I-VOP time code register 142. In an actual operation, a condition determining process to be described hereinbelow is performed at the time of reading each of picture frames, thereby performing the transmission rate adaptive packet transmission.

The read condition determining process is performed as follows. "d" seconds are properly set in accordance with the I-VOP period of the system or the like.
(1) In the case where "d" seconds>"I-VOP time code register value–time code of VOP to be read", the read pointer is moved to the latest I-VOP and the latest I-VOP is read.
(2) In the cases other than (1), an object frame is read.

In the case of FIG. 14 in which the transmission rate is high, P(3) later (having a larger time code) than I(0) stored in the I-VOP time code register 141 is read, so that the condition (1) of the read condition determining process is not satisfied. Consequently, the frame P(3) to be read of (2) is read as it is.

Figure 15:
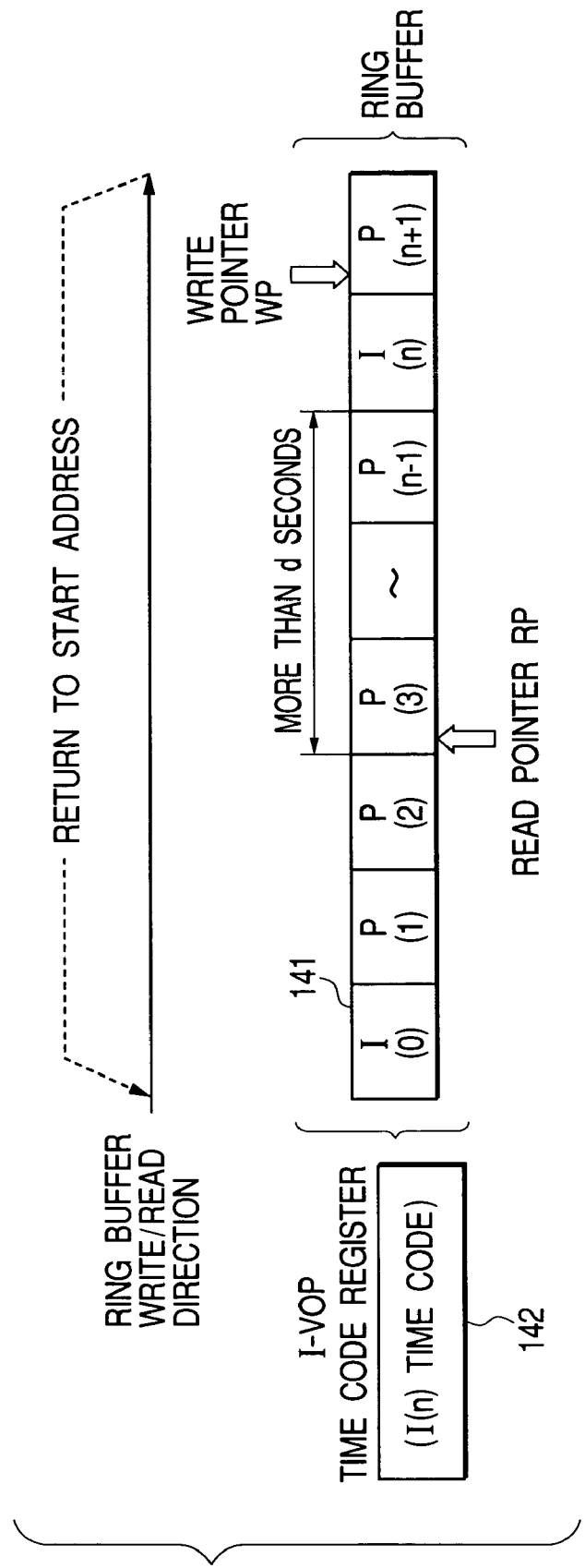
FIG. 15 is a diagram for explaining the operation of the video transmission unit shown in FIG. 13.

On the other hand, as shown in FIG. 15, there is a case that with respect to a low-rate transmission line, the read speed becomes lower than the write speed. In the read condition determining process of this case, P(3) earlier (having a smaller time code) than I(n) stored in the I-VOP time code is read. Therefore; the difference becomes "d" seconds or longer, so that the condition (1) of the condition determining process is satisfied. The read pointer RP is moved to I(n) to read I(n).

Consequently, by the operation, reading of P(3) to P(n-1) is skipped and data just before I-VOP is discarded in the I-VOP periodical buffer 133. In such a manner, the read speed is adapted to the transmission rate. Thus, the transmission rate adaptive packet transmission is realized. The "d" seconds of the read condition determining process is set in consideration of the period of I-VOP, network transmission jitter, and the like.

The transmission rate adaptive packet transmission method is also effective to a best-effort transmission line of which cost is low. That is, adaptive coded data can be automatically transmitted even there are dynamic fluctuations in the transmission rate.

As described above, according to the present invention, in a system including a plurality of transmission lines of different transmission speeds, stream data of an optimum bit rate can be distributed by one video transmission unit to all of video reception units connected and, moreover, a motion picture of desired quality can be reproduced in each of all of the video reception units connected to the transmission lines.

It will be appreciated while particular embodiments of the invention have been shown and described, modifications may be made. It is intended in the claims to cover all modifications which come within the true spirit and scope of the invention.

What is claimed is:

1. A motion picture transmission method for transmitting a motion picture signal from an input terminal to a plurality of video reception units, respectively, through a video transmission unit including a compression processing unit and a plurality of transmission lines, each of which has a different transmission speed, said method comprising the steps of:
   generating stream data containing at least a Group of Pictures (GOP) having an Intra (I) picture and a plurality of Predictive (P) pictures relating to each picture of said motion picture signal in said compression processing unit, said stream data is receivable at a video reception unit connected via a transmission line having higher transmission speed than the bit rate of said stream data;
   storing a latest of said GOP into a memory unit of said video transmission unit, said memory unit being commonly used via said transmission lines; and
   transmitting said I picture and a different number of consecutive P pictures in the latest of said GOP on a GOP unit based on varying said different number in response to different transmission speeds of said transmission lines, respectively.

2. A motion picture transmission method according to claim 1, wherein said compression processing unit encodes each picture of said motion picture signal based on either one of Motion Picture Experts Group (MPEG)-4 and MPEG-2.

3. A motion picture transmission method according to claim 1, wherein at least first GOP and second GOP are generated in said generating step, and said second GOP is transmitted in response to said s said transmission speed which is low, by canceling transmission of an afterpart of said consecutive P pictures subsequent to said I picture in said first GOP.

4. A motion picture transmission method according to claim 1, wherein at least first GOP and second GOP are generated in said generating step, and said second GOP is transmitted, in response to said transmission speed of said transmission line, by canceling transmission of an afterpart of said consecutive P pictures subsequent to said I pictures in said first GOP.

5. A motion picture transmission system comprising:
an input terminal to which a motion picture signal is applied;
a video transmission unit, coupled to said input terminal, for encoding said motion picture signal;
a plurality of transmission lines, coupled to said video transmission unit, for transmitting stream data encoded in said video transmission unit, each of which has a different transmission speed; and
a plurality of video reception units, coupled to a plurality of said transmission lines, respectively, for receiving said stream data transmitted via said transmission lines,
wherein said video transmission unit includes:
a compression processing unit for generating stream data containing at least a Group of Pictures (GOPs) having an Intra (I) picture and a plurality of Predictive (P) pictures relating to each picture of said motion picture signal, said stream data is receivable at a video reception unit connected via a transmission line having higher transmission speed than the bit rate of said stream data
a memory unit for storing a latest of said GOP into said memory being commonly used via said transmission lines; and
a selector, including a plurality of stream output units coupled to a plurality of said transmission lines, respectively, for selecting said I picture and a different number of consecutive P pictures each of which is read out from said memory unit on a GOP unit based on varying said different number in response to said transmission speeds of a plurality of said transmission lines,
wherein said video transmission unit transmits the latest of said GOP selected by each of said stream output units.

6. A motion picture transmission system according to claim 5, wherein said selector for selecting a different number of said consecutive P pictures in response to said transmission speeds of a plurality of said transmission lines and transmitting the selected number of said consecutive P pictures includes means for changing the number of consecutive P pictures subsequent to said I picture.

7. A motion picture transmission apparatus comprising:
an input terminal to which a motion picture signal is applied;
a coding unit coupled with said input terminal, for converting stream data containing at least a Group of Pictures (GOP) having at least an Intra (I) picture and a plurality of Predictive (P) pictures of said motion picture signal, said stream data is receivable at a video reception unit connected via a transmission line having higher transmission speed than the bit rate of said stream data;
a memory unit for storing the latest of said GOPs;
an output unit including a plurality of stream output units for outputting said I and P pictures each of which is read out from said memory unit on a GOP unit basis and consecutively
a plurality of transmission lines, coupled to a plurality of stream output units, respectively, for transmitting said I and P pictures, each of which has a different transmission speed;
a plurality of video reception units, coupled to a plurality of said transmission lines, respectively; and
a control unit for controlling said output unit,
wherein said control unit controls said output unit to output the latest of said GOPs including said I picture and a different number of consecutive P pictures from said I picture and a plurality of consecutive P pictures stored in said memory unit in the latest of said GOP on a GOP unit based on varying said different number in response to different transmission speeds of said transmission lines, said memory unit being commonly used to a plurality of said transmission lines.

8. A motion picture transmission apparatus according to claim 7, wherein in the case where said control unit controls said output unit to output a different number of said P pictures in response to said transmission speed of said transmission line, and transmitting them, the number of P pictures immediately preceding next I picture is cancelled.

9. A motion picture transmission method according to claim 1, wherein each of said different number is a number requested by corresponding said video reception unit, and
wherein said transmitting step starts said transmission of said I picture and a requested number of P pictures after receiving the request.

10. A motion picture transmission method according to claim 1, wherein said I and P pictures stored in said memory unit are updated whenever said request from each of said video reception units received in said video transmission unit, and the updated I and P pictures are transmitted in response to said request from each of said video reception units.

11. A motion picture transmission method according to claim 10, wherein after said I and P pictures of a transmitted GOP are received and decompressed in each of said video reception units, a next request is transmitted to said video transmission unit.

12. A motion picture transmission method according to claim 1, wherein said video transmission unit further includes a plurality of Real Time Transport Protocol (RTP) packet processing units, each of which is coupled to said compression processing unit, and a Transmission Control Protocol or User Datagram Protocol (TCP or UDP) processing unit coupled with said transmission lines, and
wherein said TCP or UDP processing unit collects packet discord ratio information from each of said video reception units, and each of said RTP packet processing unit read out said I picture and a different number of P pictures from said memory unit in response to said packet discord ratio information, so that said packet discord ratio information becomes zero and processes every VOP to one or a few packets of RTP.

* * * * *